(12) United States Patent
Zanotti

(10) Patent No.: US 12,011,005 B2
(45) Date of Patent: Jun. 18, 2024

(54) DEVICE FOR DEPOSITING POULTRY TO A POULTRY CONVEYER

(71) Applicant: Meyn Food Processing Technology B.V., Oostzaan (NL)

(72) Inventor: Massimo Zanotti, Oostzaan (NL)

(73) Assignee: Meyn Food Processing Technology B.V., Oostzaan (NL)

( * ) Notice: Subject to any disclaimer, the term of this patent is extended or adjusted under 35 U.S.C. 154(b) by 198 days.

(21) Appl. No.: 17/530,361

(22) Filed: Nov. 18, 2021

(65) Prior Publication Data
US 2022/0159977 A1    May 26, 2022

(30) Foreign Application Priority Data
Nov. 20, 2020 (NL) .................................... 2026936

(51) Int. Cl.
*A22B 7/00* (2006.01)
*B65G 47/06* (2006.01)
*B65G 47/20* (2006.01)
*B66F 9/02* (2006.01)

(52) U.S. Cl.
CPC .............. *A22B 7/001* (2013.01); *B65G 47/06* (2013.01); *B65G 47/20* (2013.01); *B66F 9/02* (2013.01)

(58) Field of Classification Search
CPC ......... A22B 7/001; B65G 47/20; B65G 47/06
USPC ...................................................... 452/177
See application file for complete search history.

(56) References Cited

U.S. PATENT DOCUMENTS

| | | | | |
|---|---|---|---|---|
| 3,812,822 A | * | 5/1974 | Blankenship | A01K 45/005 119/453 |
| 4,301,770 A | * | 11/1981 | Parker, Jr. | A01K 45/005 452/53 |
| 4,380,969 A | * | 4/1983 | Thomas | A01K 45/005 119/845 |
| 2002/0029750 A1 | * | 3/2002 | Taylor | A01K 45/005 119/843 |
| 2008/0302309 A1 | * | 12/2008 | Herman | A01K 45/005 119/453 |

FOREIGN PATENT DOCUMENTS

| | | |
|---|---|---|
| EP | 0122682 A2 | 10/1984 |
| EP | 3292753 A1 | 3/2018 |

OTHER PUBLICATIONS

Search Report for NL Patent Application No. 2026936 dated Jul. 30, 2021 (3 pages).

* cited by examiner

*Primary Examiner* — Richard T Price, Jr.
(74) *Attorney, Agent, or Firm* — Dority & Manning, P.A.

(57) ABSTRACT

A depositing device for depositing poultry from a pile of one or more stacked crates to a poultry conveyor. A tilting unit is configured for tilting the pile of one or more stacked crates around a tilt axis between a receiving position and a depositing position. A chute is tiltable between the receiving position and the depositing position independently to the tilting unit.

11 Claims, 5 Drawing Sheets

DEVICE FOR DEPOSITING POULTRY TO A POULTRY CONVEYER

PRIORITY STATEMENT

The present application claims priority under 35 U.S.C. § 119 to Dutch patent application No. 2026936, filed Nov. 20, 2020.

FIELD OF THE INVENTION

The present subject matter relates to a depositing device for depositing poultry.

BACKGROUND OF THE INVENTION

A device for depositing poultry is known from the European patent publication EP 0 122 682 A2, which discloses a device for depositing poultry onto a receiving surface from a container having a plurality of floors, via guide surfaces enclosed in a tiltable chute to adjoin the container and having an increasing length from bottom to top.

In use of such device, the chute is pivoted into a starting position in which the chute is abutted against the container carrying the poultry when a container with poultry is received by the device. Subsequently, the container and the chute are tilted together into a depositing position, in which the poultry is unloaded from the container onto the receiving surface. When the container is completely empty, the container and the chute are tilted back together into the starting position, whereafter the empty container is removed from the known device. Subsequently, another filled container is received by the known device and the process of depositing poultry onto the receiving surface is repeated.

A disadvantage of the known device is that the device is only capable of handling one container at a time, which makes the known device very uneconomical.

BRIEF DESCRIPTION OF THE INVENTION

In one of many exemplary aspects, an object of the present invention to ameliorate or to eliminate one or more disadvantages of the known device for depositing poultry, to provide an improved device for depositing poultry or to at least provide an alternative device for depositing poultry.

In one exemplary aspect, the present subject matter relates to a depositing device for depositing poultry, from a pile of one or more stacked crates to a poultry conveyor. In another exemplary aspect, the invention relates to a method for depositing poultry from a pile of one or more stacked crates to a poultry conveyer.

According to one exemplary embodiment, the present invention provides a depositing device for depositing poultry from a pile of one or more stacked crates to a poultry conveyor, wherein the depositing device includes a tilting unit and a chute. In this embodiment, the tilting unit is configured for tilting the pile of one or more stacked crates around a tilt axis between a receiving position, in which the pile of one or more stacked crates is received, and a depositing position, in which poultry is transferred from the pile of one or more stacked crates to the poultry conveyor via the chute. For this embodiment, the chute is tiltable between the receiving position and the depositing position independently to the tilting unit.

In another exemplary aspect of the invention, a depositing device may provide the possibility to tilt the tilting unit back into the receiving position independently of the chute, when the pile of one or more crates is emptied and while simultaneously poultry is deposited from the chute to the poultry conveyor. The emptied pile of crates may be replaced with a filled pile of stacked crates, while the chute is in the depositing position and/or is being tilted back into its receiving position. When the chute is back in the receiving position, the tilting unit and the chute may be tilted into the depositing position again. In such case, it is no longer necessary to wait for the emptied pile of multiple crates being replaced by a filled pile of multiple crates, such that more poultry may be deposited to the poultry conveyor in a time period in comparison with the known depositing device. This result can provide a more cost-effective process of processing poultry.

In the context of the present patent application, a pile of one or more crates should also be understood as a plurality of stacked containers and/or as a module including different cages on top of each other.

In one exemplary embodiment, the chute is tiltable around the tilt axis.

In another exemplary embodiment, the tilting unit may include a tilting mechanism configured for tilting the tilting unit, and the chute includes an additional tilting mechanism configured for tilting the chute. By providing each of the tilting unit and the chute with its own tilting mechanism, controlling the tilting movement of each of the tilting unit and the chute is accomplished advantageously with a relatively easy construction.

In another exemplary embodiment, at least one of the tilting mechanism and the additional tilting mechanism is a rack and pinion actuator. The depositing device for example may be used in a slaughterhouse environment which may be very demanding for the components of the depositing device. In one exemplary aspect of the invention, the inventor has surprisingly found that using a rack and pinion actuator for tilting the tilting unit and the chute provides a reliable and robust tilting mechanism that may be used in rough environments.

In another exemplary embodiment, the chute may have four sidewalls defining a guiding channel within the chute for guiding poultry, and a door arranged for keeping the poultry in the chute when the door is closed. The depositing device described in EP 0 122 682 has a further disadvantage in that all poultry present within the container is unloaded at once from the respective container onto the receiving surface via the chute when the container and the chute are tilted together into the deposing position. As a result, all poultry may be deposited at once onto the receiving surface, such that all poultry is deposited onto a relatively small surface.

During use of the depositing device according to this exemplary embodiment of the present invention, tilting the pile of one or more crates about the tilt axis can result in unloading poultry from the pile of one or more crates into the guiding channel within the chute. Subsequently, the door may be opened in order to deposit the poultry from the chute onto the poultry conveyor, such that the poultry may be deposited from the chute gradually. The poultry, therefore, is prevented advantageously from being deposited onto the poultry conveyor at once and is deposited onto the poultry conveyor over a larger surface in comparison with EP 0 122 682.

In another exemplary embodiment, the chute may include a guiding platform arranged therein, wherein the guiding platform divides the guiding channel into two or more sub-channels and is arranged such that each of the two or more sub-channels connects with at least one crate of the pile of one or more crates. In an exemplary embodiment thereof, the door may be arranged at the end of at least one of the two or more sub-channels facing away from the tilting unit, and the door may be configured for opening or closing the at least one sub-channel. In another exemplary embodiment, the depositing device includes a further door arranged at the end of another one of the two or more sub-channels facing away from the tilting unit, wherein the door and the further door are configured for opening and closing independently of each other. During use of the depositing device, the poultry present within one of the sub-channels may be deposited to the poultry conveyor by opening the door of that respective sub-channel, before the further door at another one of the two or more sub-channels is opened in order to deposit poultry from that respective sub-channel to the poultry conveyor. The poultry conveyor may be conveying the received poultry directly away from the depositing device. As a result, the poultry can be unloaded advantageously over a larger surface of the poultry conveyor in comparison with the depositing device of EP 0 122 682.

According to a another exemplary aspect, the present invention may provide a method for depositing poultry from a pile of one or more stacked crates to a poultry conveyer by means of a depositing device that can include a tilting unit and a chute. The method can include providing the pile of one or more stacked crates to the tilting unit, while the tilting unit is in a receiving position; and tilting the tilting unit and the chute in order to bring the tilting unit and the chute into a depositing position, in which poultry is transferred from the pile of one or more stacked crates to the poultry conveyor via the chute. This exemplary method may include tilting the chute between the depositing position and the receiving position independently to the tilting unit.

This exemplary method of the invention can have at least the same advantages as described in relation to the depositing device according to earlier described embodiments of the invention.

In an exemplary embodiment where the chute includes four sidewalls defining a guiding channel within the chute for guiding poultry and a door arranged for keeping the poultry in the chute when the door is closed, the exemplary method may include opening the door in order to deposit poultry to the poultry conveyor, while the tilting unit is tilting back into the receiving position together with the pile of one or more stacked crates once the pile of one or more stacked crates is empty.

In another exemplary embodiment, wherein the chute includes a guiding platform arranged therein, wherein the guiding platform divides the guiding channel into two or more sub-channels and is arranged such that each of the two or more sub-channels connects with at least one crate of the pile of one or more crates, wherein the door is arranged at the end of at least one of the two or more sub-channels facing away from the tilting unit, the exemplary method may include opening the door to deposit poultry from the at least one sub-channel. Optionally, the door may be opened after the poultry has been deposited from another one of the two or more sub-channels In another exemplary embodiment, wherein the chute is provided with a further door at the end of another one of the two or more sub-channels, the method may include opening the door and the further door independently of each other, while depositing poultry from the chute to the poultry conveyor.

According to another exemplary aspect, the invention provides an assembly for depositing poultry from a pile of one or more stacked crates to a poultry conveyor. The assembly may include a supplying conveyor configured for supplying piles of one or more stacked crates to a depositing device according to the first aspect of the invention; a depositing device according to the other exemplary aspects of the invention, arranged downstream of the supplying conveyor; a poultry conveyor can be arranged downstream of the depositing device and configured for receiving poultry from the depositing device and for conveying poultry away from the depositing device; and a removing conveyor can be arranged downstream of the depositing device and configured for removing emptied piles of one or more stacked crates from the depositing device.

These and other objects and advantages are provided by an apparatus and method according to the invention which has the features of one or more of the appended claims.

BRIEF DESCRIPTION OF THE DRAWINGS

The invention will be further elucidated on the basis of one or more exemplary embodiments shown in the attached drawings, in which.

DETAILED DESCRIPTION OF THE INVENTION

For purposes of describing the invention, reference now will be made in detail to embodiments and/or methods of the invention, one or more examples of which are illustrated in or with the drawings. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with another embodiment or steps to yield a still further embodiments or methods. Thus, it is intended that the present invention covers such modifications and variations as come within the scope of the appended claims and their equivalents.

Figure 1A:
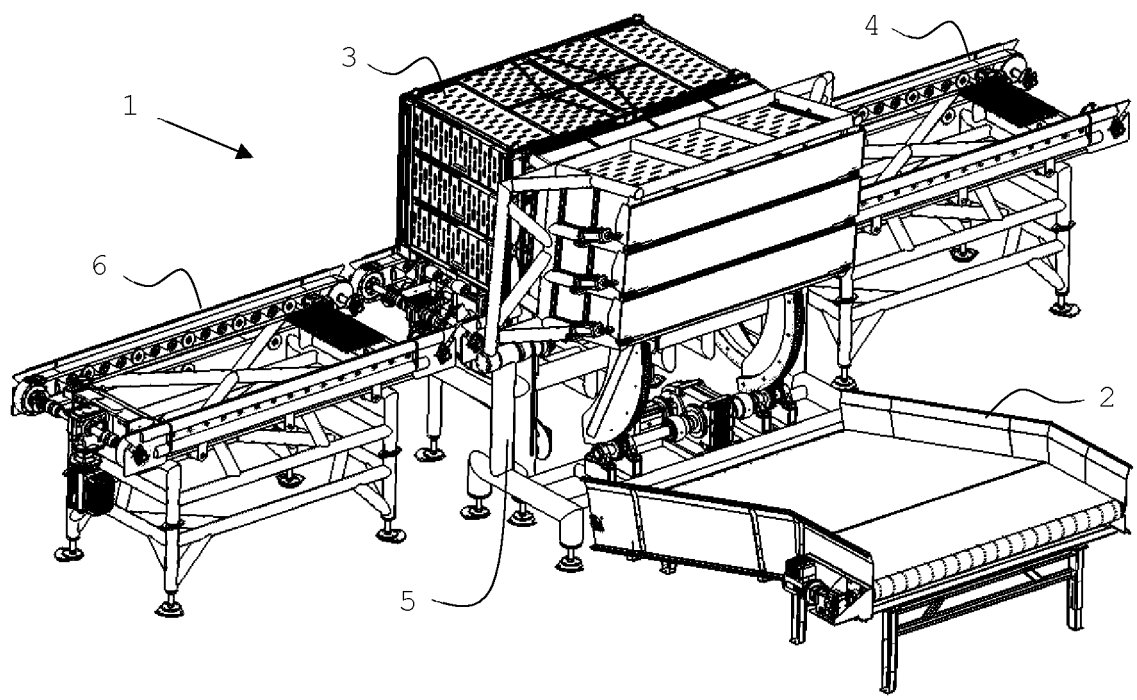
FIGS. 1A and 1B show an isometric view and top view, respectively, of an assembly for unloading poultry from a pile of multiple stacked crates to a poultry conveyor according to an exemplary embodiment of the invention.
Figure 1B:
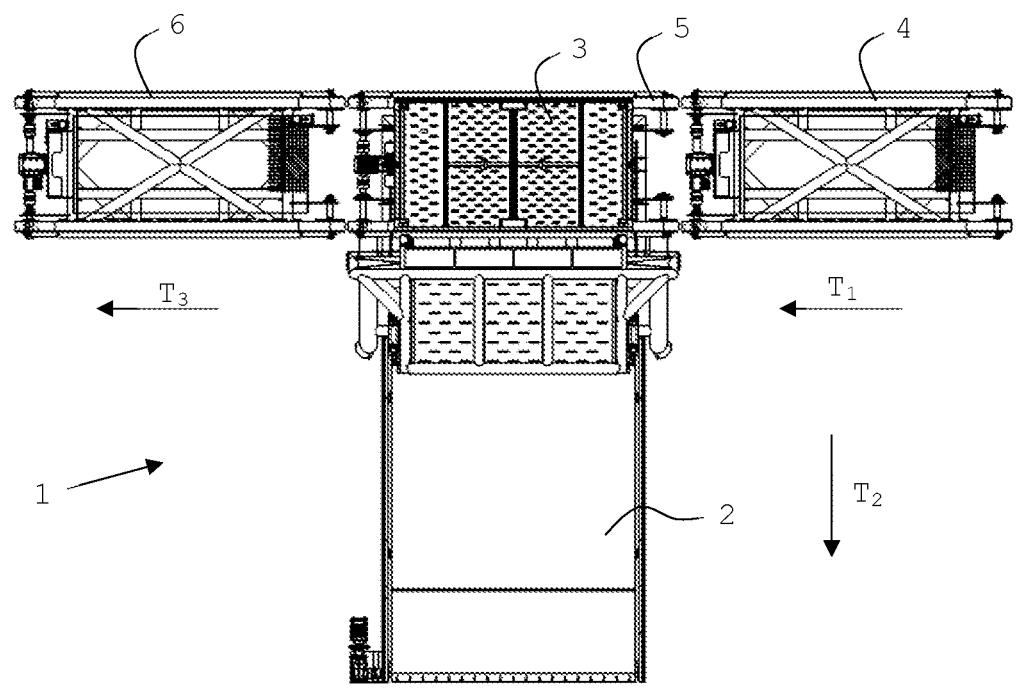

An exemplary embodiment of an assembly 1 for unloading poultry, such as turkeys, to a poultry conveyor 2 from a pile 3 of multiple crates is shown in FIGS. 1A and 1B. For this exemplary embodiment, the assembly 1 includes a supplying conveyor 4, a depositing device 5, and a removing conveyor 6. During use, the supplying conveyor 4 supplies a pile 3 of multiple crates to the depositing device 5, wherein the pile 3 of multiple crates is moved in a first transport direction T1. When the pile 3 of multiple crates is received by the depositing device 5, the depositing device 5 is configured to deposit the poultry carried by the pile 3 of multiple crates to the poultry conveyor 2. The poultry conveyor 2 is configured for conveying the poultry away from the depositing device 5 for further processing in a second transport direction T2 substantially transverse or transverse to the first transport direction T1. When the pile 3 of multiple crates is emptied, the empty pile 3 of multiple crates is transferred to the removing conveyor 6 configured for moving the empty pile 3 of multiple crates away from the depositing device 5 in a third transport direction T3 substantially parallel to the first transport direction T1. Subsequently, the empty pile 3 of multiple crates, for example, may be cleaned in order to be used again.

Figure 2A:
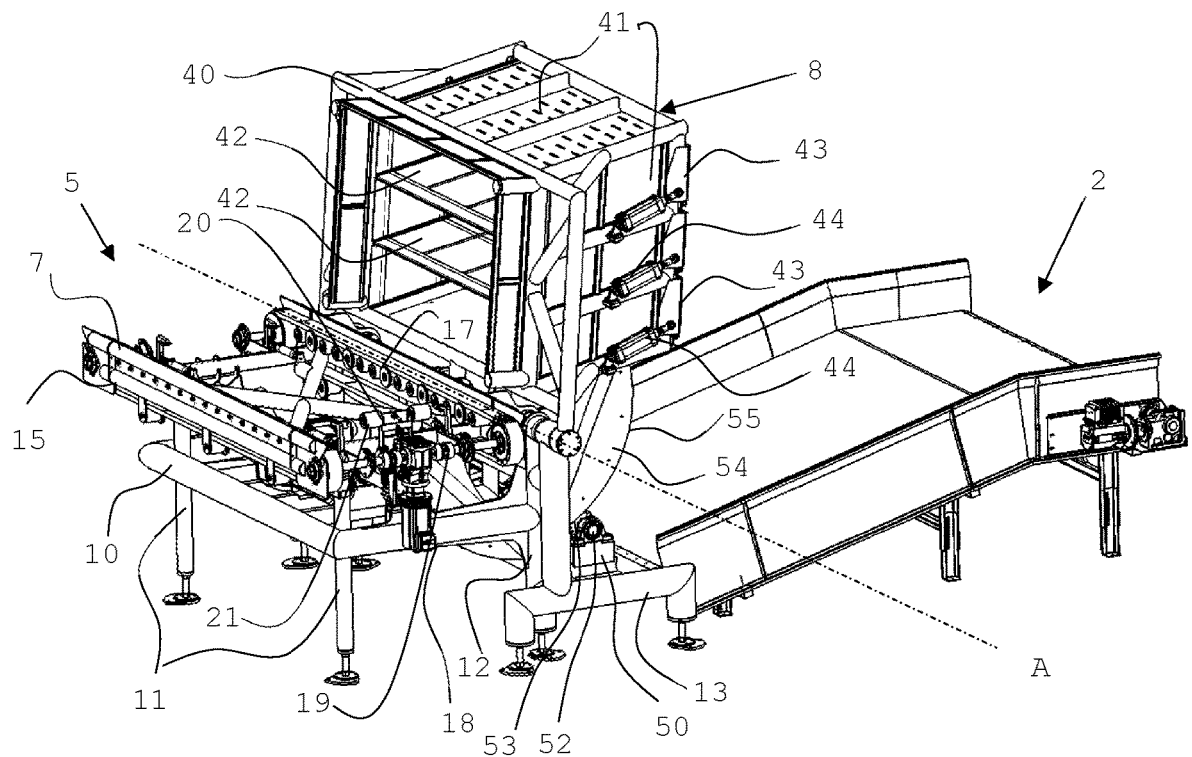
FIGS. 2A and 2B show an isometric view of a depositing device for depositing poultry from a pile of multiple stacked crates to a poultry conveyer in a receiving position according to an exemplary embodiment of the invention; and an isometric view of the depositing device of FIG. 2A in a depositing position.
Figure 2B:
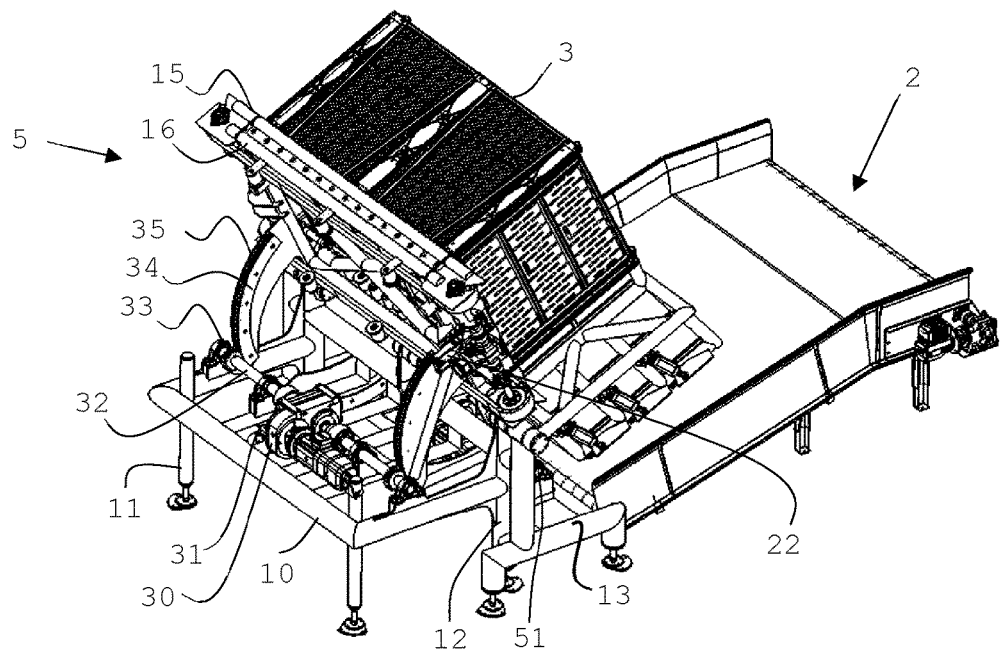

A first isometric view and a second isometric view of the depositing device 5 and the poultry conveyor 2 of FIG. 1A are shown in FIGS. 2A and 2B, respectively. FIG. 2A shows the depositing device 5 in a receiving position, and FIG. 2B shows the depositing device 5 in a depositing position. The depositing device 5 includes a tilting unit 7 and a chute 8. The tilting unit 7 is provided with a main frame 10 having first legs 11 arranged at one longitudinal side of the main frame 10, and second legs 12 at the other longitudinal side of the main frame 12. The first legs 11 are slightly lower than the second legs 12. The depositing device 5 has stabilizing legs 13 arranged adjacent to the second legs 12 and extending substantially parallel to and approximately to the same height as the second legs 12.

The tilting unit 7 is further provided with a tilting frame 15 tiltable arranged at the upper end of the second legs 12. The tilting frame 15 has a first longitudinal roller track 16 and a second longitudinal roller track 17 opposite to the first roller track 16 for conveying the pile 3 of multiple crates along the tilting frame 15 and for supporting the pile 3 of multiple crates. The first roller track 16 and the second roller track 17 are operatively connected to a driving unit 18 by means of a driving axle 19.

The tilting unit 5 further includes a locking portion 20 with locking levers 21 in order to lock the pile 3 of multiple crates to the tilting unit 5, in particular the tilting frame 15 thereof. The locking portion 20 is provided with a pneumatic cylinder 22 in order to move the locking levers between a raised position, in which the pile 3 of multiple crates is locked to the tilting frame 15, and a lowered position, in which the pile 3 of multiple crates is allowed to be transferred to the removing conveyor 6.

A tilting mechanism 30 is provided for tilting the tilting frame 15. The tilting mechanism 30 has a tilting drive 31 arranged at the main frame 10. A tilting driving axle 32 extends in two opposite directions from the tilting drive 31 to the transverse sides of the main frame 10. The ends of the driving axle 32 facing away from the tilting drive 31 are arranged rotatably at the main frame 10. A pinion 33 is arranged at the driving axle 32 at both sides of the tilting drive 31. The tilting frame 15 is provided with two curved racks 34 at the side facing the main frame 10. Each of the two racks 34 is provided with an array of teeth 35 at the side facing towards the driving axle 32 for engaging with one of the pinions 33, therewith constituting a rack and pinion actuator. During use, rotational movement of the pinions 33 causes the racks 34 to be moved along the pinions 33, therewith resulting in a tilt movement of the tilting frame 15 around a tilt axis A extending through the upper ends of the second legs 12.

For this exemplary embodiment, the chute 8 is provided with a chute frame 40 arranged rotatably around the tilt axis A at the upper end of the stabilizing legs 13. The chute 8 has four sidewalls 41 defining a guiding channel, and a number of guiding platforms 42 arranged therebetween and substantially parallel to each other. The guiding platforms 42 divide the guiding channel into sub-channels for guiding the poultry towards the poultry conveyor 2, and are arranged such that each of the sub-channels connects to at least one crate of the pile 3 of multiple stacked crates. A door 43 is provided at the end of each sub-channel and is arranged rotatably to the sidewalls 41 for opening or closing the sub-channel. Two door actuators 44 are arranged per door 43 at opposite sides of the chute 8 for opening and closing the respective door 43.

An additional tilting mechanism 50 is arranged between the two stabilizing legs 13 for tilting the chute 8. The additional tilting mechanism 50 has an additional tilting drive 51 with an additional tilting driving axle 52 extending from the additional tilting drive 51 towards each of the stabilizing legs 13. The ends of the driving axle 52 facing away from the additional tilting drive 51 are arranged rotatably at the stabilizing legs 13. An additional pinion 53 is arranged at the additional driving axle 52 at each side of the additional tilting drive 51. The chute 8 is provided with two additional curved racks 54 at the side facing downwards. Each of the two additional racks 54 has an array of teeth 55 at the side facing towards the additional driving axle 52 for engaging with one of the additional pinions 53, therewith constituting a rack and pinion actuator. During use, rotational movement of the additional pinions 53 causes the additional racks 54 to be moved along the additional pinions 53, therewith resulting in a tilting movement of the chute 8 around the tilt axis A.

Figure 3A:
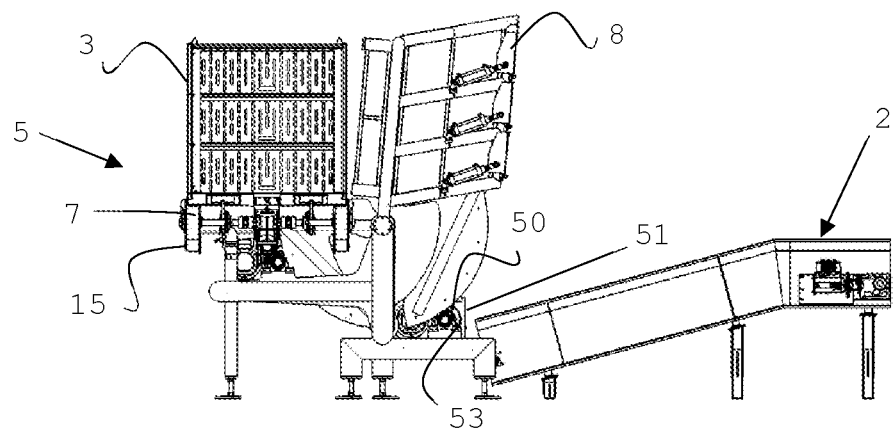
FIGS. 3A-3G show the depositing device of FIG. 2B during different aspects of an exemplary method for depositing poultry from a pile of multiple stacked crates to a poultry conveyer according to exemplary embodiments of the invention.

The depositing device 5 during the steps of a method for depositing poultry from a pile 3 of one or more stacked crates to a poultry conveyer 2 according to an embodiment of the invention is shown in FIGS. 3A-3G. FIG. 3A indicates the depositing device 5 during the step of a pile 3 of multiple crates being received by the tilting unit 7 from the supplying conveyor 4, while the tilting unit 7 and the chute are in the receiving position. Subsequently, the pile 3 of multiple crates is locked to the tilting frame 15 by means of the locking portion 20.

Figure 3B:
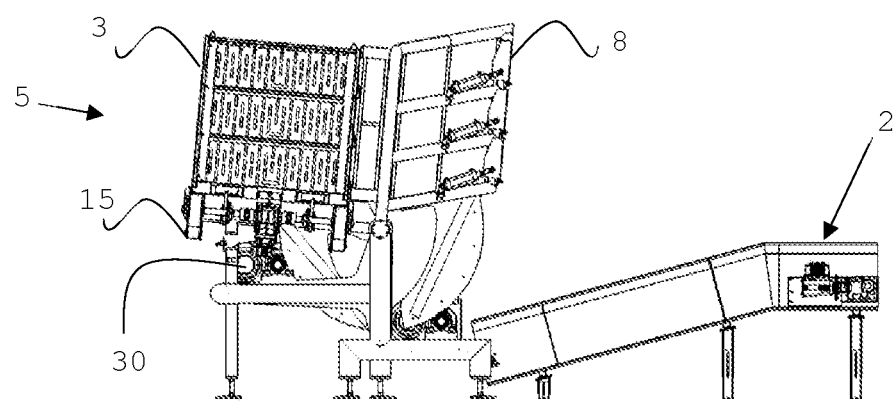

FIG. 3B indicates the depositing device 5 during the step of rotating the tilting unit 7 in a first rotation direction over a first angle, in this case of approximately 5 degrees. During this step, the pile 3 of multiple crates goes into mechanical stop on the chute 8.

Figure 3C:
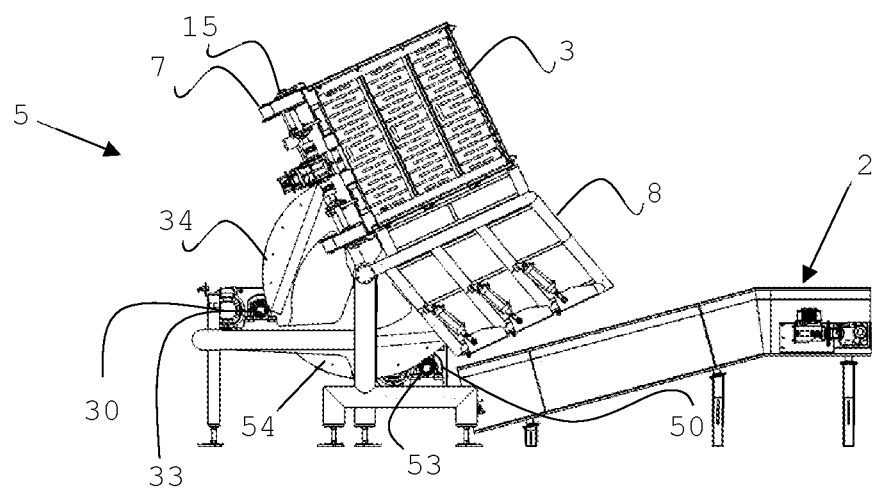

FIG. 3C indicates the depositing device 5 during the step of rotating the tilting unit 7 and the chute 8 together in the first rotation direction over a second angle, in this case of approximately 60 degrees, into the depositing position. During rotating the tilting unit 7 and the chute 8 together, doors of the crates are opened and poultry, such as turkeys, is moved from the pile 3 of multiple crates into the chute 8.

Figure 3D:
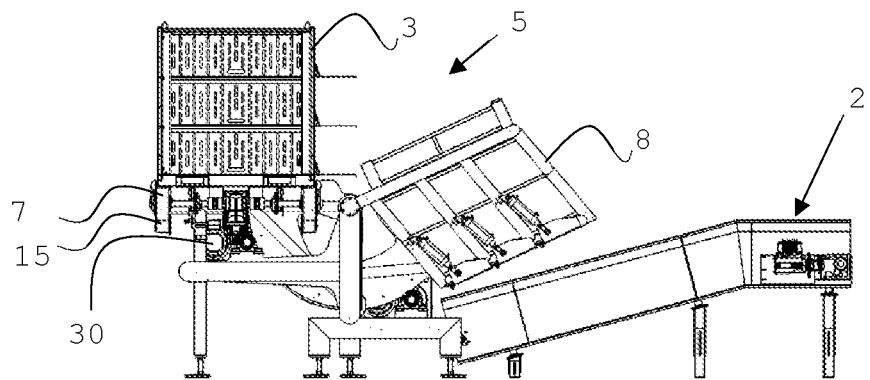

FIG. 3D indicates the depositing device 5 during the step of rotating the tilting unit 7, in particular the tilting frame 15 thereof, in a second rotation direction, opposite to the first rotation direction, over a third angle, in this case of approximately 65 degrees. During this step, the crates of the pile 3 of multiple crates are empty and the turkeys are within the chute 8.

Figure 3E:
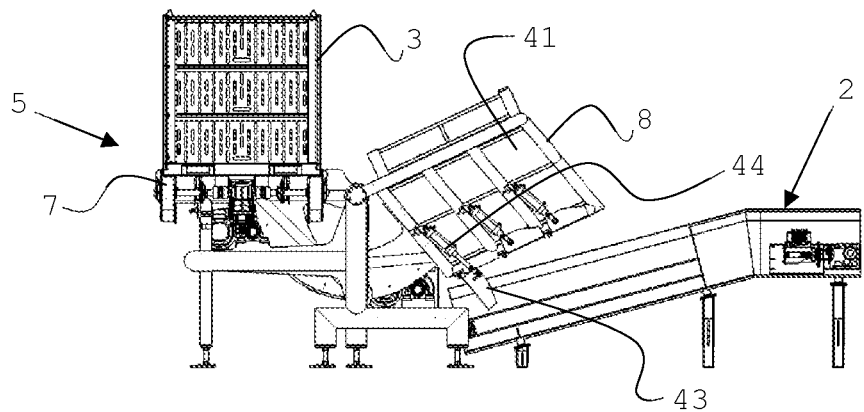
Figure 3F:
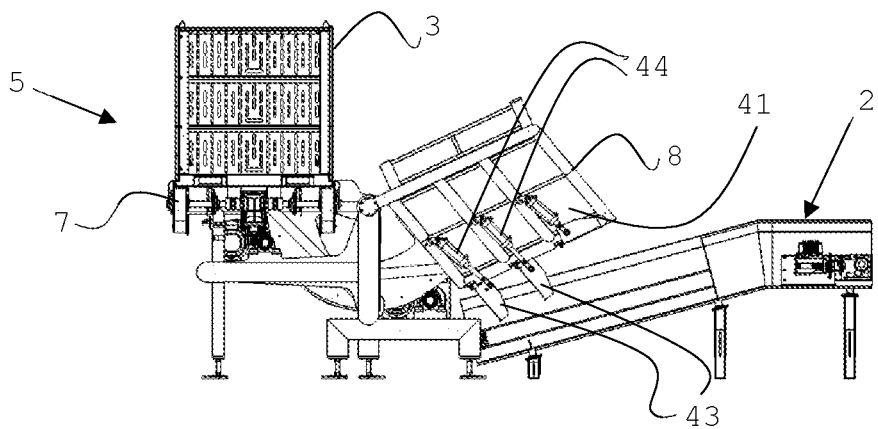
Figure 3G:
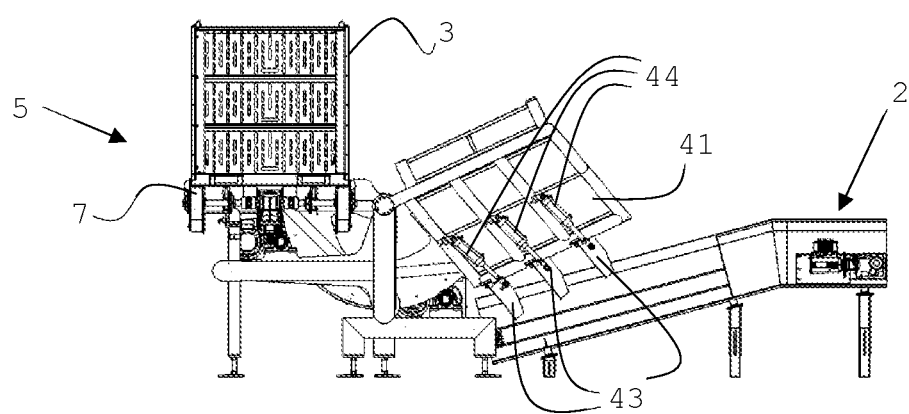

FIGS. 3E-3G indicate the different stages of the step of sequentially opening the doors 43 of the chute 41 by operating the associated door actuators 44. By sequentially opening the doors 43, the turkeys are unloaded onto the active poultry conveyor 2 step-by-step, therewith spreading the turkeys over a large surface of the poultry conveyor 2. During steps 3E-3G, the emptied pile 3 of multiple crates is unlocked from the tilting frame by bringing the locking levers 21 into the lowered position, and is transferred to the removing conveyor 6 in order to be conveyed away from the depositing device 5 for further processing, such as cleaning. Simultaneously or at least almost simultaneously, another filled pile 3 of multiple crates is received by the tilting unit 7. When step 3G is completed, the doors 43 are closed and the chute 8 is returned to the position shown in FIG. 3A. Since a new pile 3 of multiple crates is already waiting for the chute 8, the step as indicated in FIG. 3B may be performed immediately after the chute 8 reaching the position as shown in FIG. 3A.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

The invention claimed is:

1. A depositing device for depositing poultry from a pile of one or more stacked crates to a poultry conveyor, the depositing device comprising:
   a tilting unit; and
   a chute, tiltable between a receiving position and a deposition position independently of the tilting unit, the chute comprising four sidewalls defining a guiding channel within the chute for guiding poultry, and a door arranged for keeping the poultry in the chute when the door is closed;
   wherein the tilting unit is configured for tilting the pile of one or more stacked crates around a tilt axis between the receiving position, in which the pile of one or more stacked crates is received, and the depositing position, in which poultry is transferred from the pile of one or more stacked crates to the poultry conveyor by the chute.

2. The depositing device according to claim 1, wherein the chute is tiltable around the tilt axis.

3. The depositing device according to claim 1, wherein the tilting unit comprises a tilting mechanism configured for tilting the tilting unit, and wherein the chute comprises an additional tilting mechanism configured for tilting the chute.

4. The depositing device according to claim 3, wherein at least one of the tilting mechanism and the additional tilting mechanism is a rack and pinion actuator.

5. The depositing device according to claim 1, wherein the chute comprises a guiding platform arranged therein, wherein the guiding platform divides the guiding channel into two or more sub-channels and is arranged such that each of the two or more sub-channels connects with at least one crate of the pile of one or more crates.

6. The depositing device according to claim 5, wherein the door is arranged at the end of at least one of the two or more sub-channels facing away from the tilting unit, and wherein the door is configured for opening or closing the at least one sub-channel.

7. The depositing device according to claim 6, further comprising
   a further door arranged at the end of another one of the two or more sub-channels facing away from the tilting unit, wherein the door and the further door are configured for opening and closing independently of each other.

8. A method for depositing poultry from a pile of one or more stacked crates to a poultry conveyer by means of a depositing device that includes a tilting unit and a chute, wherein the chute comprises four sidewalls defining a guiding channel within the chute for guiding poultry, and a door arranged for keeping the poultry in the chute when the door is closed, the method comprising:
   providing the pile of one or more stacked crates to the tilting unit while the tilting unit is in a receiving position;
   tilting the tilting unit and the chute in order to bring the tilting unit and the chute into a depositing position, in which poultry is transferred from the pile of one or more stacked crates to the poultry conveyor via the chute, wherein the tilting the chute between the depositing position and the receiving position is conducted independently to the tilting unit, and
   opening the door in order to deposit poultry to the poultry conveyor while the tilting unit is tilting back into the receiving position together with the pile of one or more stacked crates once the pile of one or more stacked crates is empty.

9. The method according to claim 8, wherein the chute comprises a guiding platform arranged therein, wherein the guiding platform divides the guiding channel into two or more sub-channels and is arranged such that each of the two or more sub-channels connects with at least one crate of the pile of one or more crates, wherein the door is arranged at the end of at least one of the two or more sub-channels facing away from the tilting unit, and wherein the method comprises the step of opening the door to deposit poultry from the at least one sub-channel.

10. The method according to claim 9, wherein the chute is provided with a further door at the end of another one of the two or more sub-channels, wherein the method comprises the step of opening the door and the further door independently of each other, while depositing poultry from the chute to the poultry conveyor.

11. An assembly for depositing poultry from a pile of one or more stacked crates to a poultry conveyor, the assembly comprising:
   a supplying conveyor configured for supplying piles of one or more stacked crates to a depositing device according to claim 1;
   a depositing device according to claim 1, arranged downstream of the supplying conveyor;
   a poultry conveyor arranged downstream of the depositing device and configured for receiving poultry from the depositing device and for conveying poultry away from the depositing device; and
   a removing conveyor arranged downstream of the depositing device and configured for removing emptied piles of one or more stacked crates from the depositing device.

* * * * *